Oct. 31, 1933.　　F. C. MOCK ET AL　　1,933,381

CARBURETOR

Filed May 21, 1930　　5 Sheets-Sheet 3

INVENTORS
Frank C. Mock
BY Jeptha MacKenzie Miller
ATTORNEY

Fig. 9

Patented Oct. 31, 1933

1,933,381

UNITED STATES PATENT OFFICE 1,933,381

CARBURETOR

Frank C. Mock, Chicago, Ill., and Jeptha Mackenzie Miller, South Bend, Ind., assignors to Bendix Stromberg Carburetor Company, South Bend, Ind., a corporation of Illinois Application May 21, 1930. Serial No. 454,230

10 Claims. (Cl. 261—34)

Our invention relates to carburetors and is more particularly concerned with the provision of improved means for supplying correct quantities of fuel under all conditions of operation in airplane use.

An object of this invention is to provide a novel type of float to control the feed of fuel into the float chamber so that a positive and uniform supply of fuel will be fed to the carbureting chamber regardless of the position and speed of the airplane.

Another object of our invention is to provide a readily accessible and cleanable liquid fuel strainer so that same can be easily removed for cleaning from the outside of the carburetor without disturbing any other parts.

Another object of this invention is to provide a novel design of altitude control comprising a main metering jet, a mixture control needle valve with a seat considerably larger than the main metering jet adapted to cut off the flow from the float chamber to the main metering jet. In the side of the needle valve seat, below the seating point of the needle, we provide an orifice limiting the amount of control obtainable. The size of this orifice is such as to give the right mixture when the airplane is at or near its ceiling, and it is thus impossible for the pilot to cut off the fuel altogether by improper handling of the control and the control is also much less sensitive at high altitudes. We do not have the needle valve seat in the metering nozzle because we want to preserve an exact sea level adjustment of the metering nozzle. Also, it is desirable to be able to change the sea level adjustment by small but exact increments which is effected in our device by a simple substitution of metering nozzles of different sizes.

This arrangement of metering nozzle, needle valve, and fixed or limiting by-pass is believed to be novel in the art and is highly advantageous in the high altitude operation of airplane carburetors.

Still another object of our invention is to provide a novel improved means of operating the altitude control needle by a shaft reaching across the float chamber and engaging the slotted upper end of the altitude control needle with an eccentric pin. Such an arrangement affords a compact assembly with chances for leakage of liquid fuel to the exterior of the carburetor reduced to a minimum. Both of these points are of great value in airplane operation, as it reduces the space required by the fire risk due to leaking gasoline. The operating shaft is made relatively large in diameter so as to permit withdrawing eccentric, pin and all. This greatly increases the accessibility and demountability of the assembly. Also, the altitude control needle valve is threaded into the upper slotted end shank so that the length of the needle can be adjusted to seat in any desired position of the mixture control lever.

A still further object of our invention is to provide a novel means for the joint operation of the economizer valve and the acceleration pump consisting of an intermediate operating member located in the float chamber space, thereby reducing the areas for leakage from the float chamber and minimizing the entrance of dirt. Also the provision of only one operating connection from the throttle to both economizer and pump insures exact relation of pump travel to economizer valve travel.

A still further object of our invention is to provide a combined manual or automatic means of regulating the main jet mixture control in conjunction with means for reducing the economizer jet delivery in predetermined proportion.

With these and other objects in view which may be incident to our improvements, our invention consists in the following novel combination, proportion and arrangement of elements which, for the purpose of explanation, we have illustrated one embodiment in the accompanying drawings.

Figure 1:
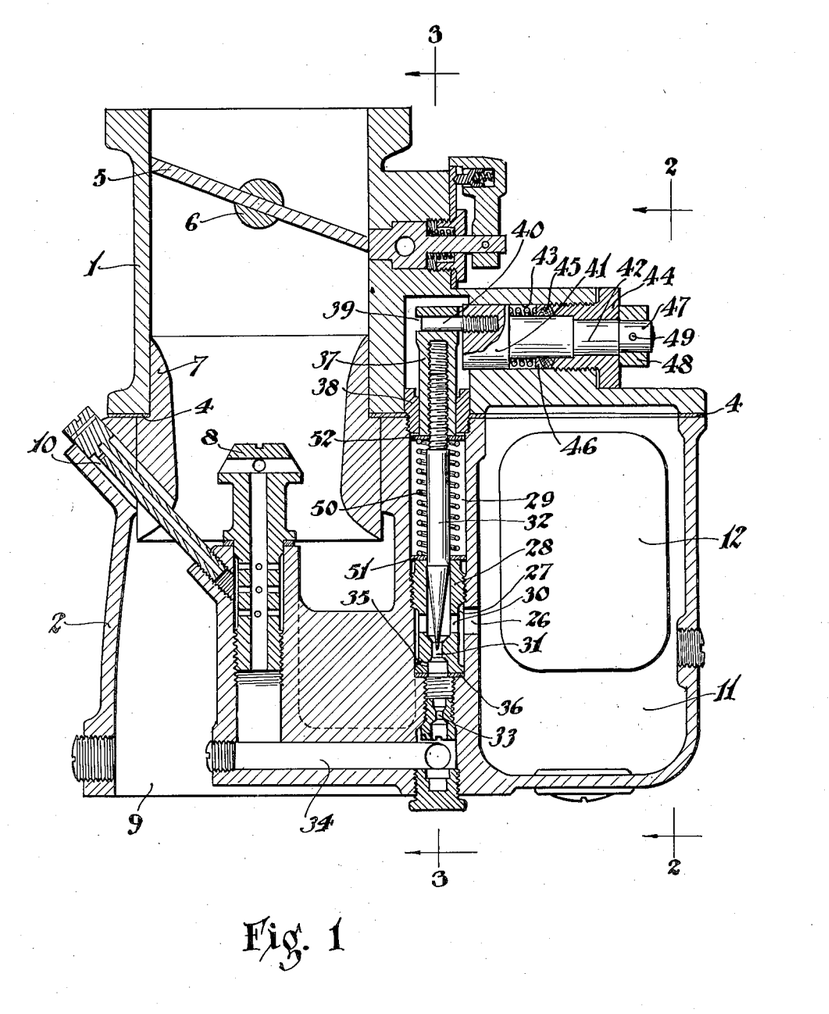
Figure 1 is a vertical longitudinal section of a carburetor embodying our improvements.

Referring particularly to Figure 1, the main body of the carburetor is formed in two die cast parts, although obviously this may be varied, these parts having suitable passageways formed therein and provided with fittings to complete the construction. When so formed, the carburetor consists of an upper body portion 1 and a lower body portion 2 which are fastened together by suitable screws 3 (see Figures 2 and 7) with a gasket 4 interposed between the parts, making the carburetor body fluid tight.

In the upper part of body portion 1 is journalled a butterfly throttle valve 5 on a shaft 6, and spanning the joint between body portions 1 and 2 is fixed a Venturi tube 7. A main jet nozzle 8 is fixed concentric with the main air inlet 9 and Venturi tube 8, and has an air bleed tube 10 leading to the outside of the carburetor body 2. Cast integral with the lower body portion 2 is a float chamber 11 in which is located a float 12 fixed to an arm 13 (see Figure 2) fulcrumed on a shaft 14. Arm 13 carries a pin 15 which engages in a notch 16 in a hollow tubular plunger 17 and this transmits the motion and force of the float 12 to a valve 18 which is fixed in plunger 17 and engages a seat 19, thus controlling the admission of liquid fuel from passageway 20 to the float chamber 12. Passageway 20 communicates with a vertical passageway 21 which in turn communicates with the fuel inlet bore 22 (see Figure 3) to which is attached the fuel supply pipe (not shown). Located in the vertical passageway 21 is a hollow cylindrical screen 23 which is fastened at its lower end into a base plug 24 which not only holds the screen 23 in position but also closes the lower end of passageway 21 by screw thread engagement with body 2. Screen 23 is held in vertical spaced relation to passageway 21 by a collar 25 which is attached to the upper end of screen 23 and which has a close slidable fit in the upper end of passageway 21. Collar 25 not only holds the upper end of screen 23 in vertical alignment with passageway 21, but also prevents liquid fuel which enters through bore 22 from passing down passageway 21 without going through screen 23.

Thus liquid fuel which enters through bore 22 tangentially to the wall of screen 23 is compelled to flow helically down the inside of the screen, thence through the screen and out by passageway 20. In this way any dirt in the liquid fuel is washed down to the bottom screen 23 and collects on top of plug 24. This plug is readily removable from the outside of the carburetor without removing the air horn so that screen 23 is very accessible for cleaning. The helical flow of fuel over the surface of the screen constantly washes all dirt to the bottom so that screen 23 is largely self-cleaning and only requires removal at infrequent intervals.

Figure 2:
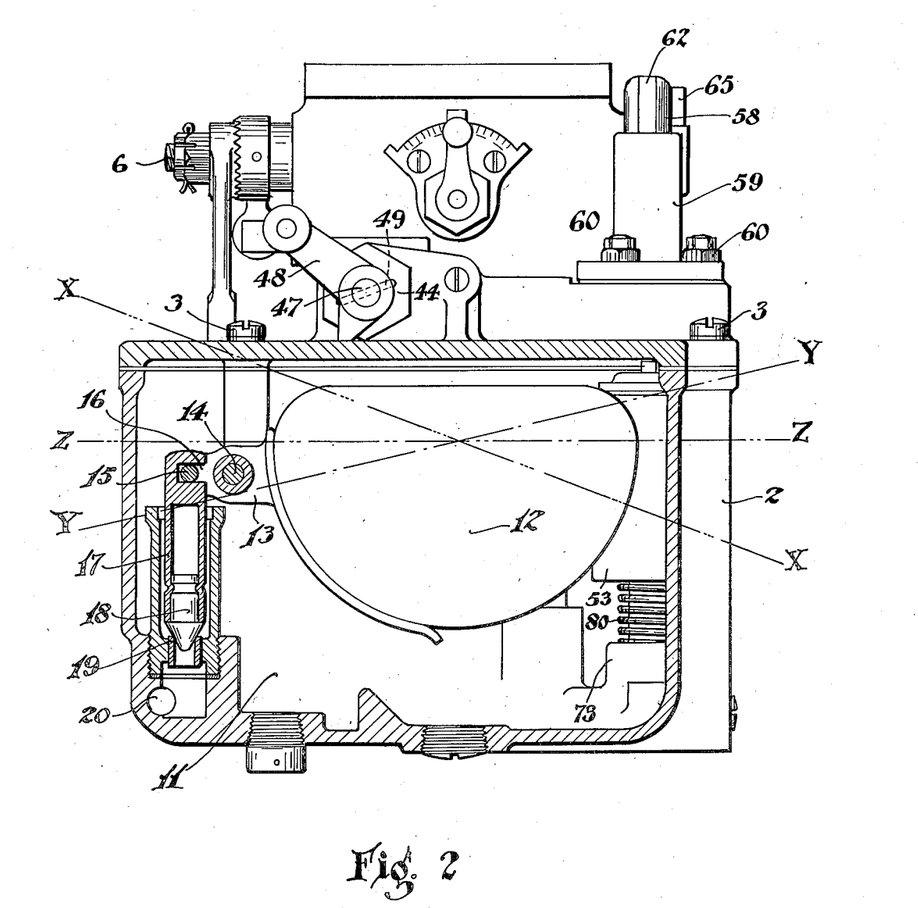
Figure 2 is a section along the line 2—2 of Figure 1.

The peculiar kidney-shaped float shown in Figure 2 is of particular importance and great advantage for airplane operation. The first floats used in airplane carburetors were spherical as these were least affected by moderate inclinations of the plane, but they had two serious disadvantages: first, they required large float chambers both in diameter and height, which is objectionable in airplane use because of the limited space available for the carburetor; and, second, the relatively great distance from the center of the float chamber to the orifice of the main jet nozzle caused considerable variation in the liquid level at the fuel nozzle with various inclinations of the carburetor. The first step toward improvement was to shorten the distance between the center of the float chamber and the orifice of the main nozzle by making the float cylindrical with a relatively narrow float chamber having generally straight substantially parallel sides, said float chamber being disposed with one of its straight sides in immediate proximity to the carburetor barrel, so that there was a minimum variation of liquid level at the fuel nozzle with various inclinations of the carburetor.

This cured the second defect noted above, but not the first, as it still required a float chamber of relatively great height which not only objectionally increased the size of the carburetor but left considerable head room above the float. With such head room, when there is a sudden downward acceleration greater than gravity (as when an airplane is diving), the liquid fuel goes to the top of the float chamber and forces the air to the bottom and the outlet from the float chamber to the main jet is uncovered and the fuel feed interrupted. The problem was then how to reduce the height and head room of the float chamber without running into the other difficulties noted above. In trying to solve this problem, we first tried a rectangularly shaped float, but found that it was too seriously affected by small inclinations of the carburetor, due to its changing submerged shape as the carburetor is inclined. We then experimented with floats of various shapes and found that only the peculiar kidney-shaped float shown in Figure 2 solved the problem. Its flat top permitted a substantially shorter float chamber and reduced the head room to the minimum while its cylindrical lower part gave it a substantially constant submerged bulk for the required angles of inclination. This will be appreciated from an inspection of Figure 2. Thus, when the carburetor is level, the liquid fuel line is at Z—Z; when the carburetor is inclined to the right, the liquid level is at X—X and when the carburetor is inclined to the left, the liquid level is at Y—Y.

It will be noted that in each case, the submerged bulk is substantially the same and the metacenter of the float has not shifted appreciably and therefore the valve 18 is unaffected by such inclinations. It will also be noted that the height of the float chamber and the head room above the liquid have been greatly reduced by the use of our special kidney-shaped float, so that with a sudden downward acceleration greater than gravity when the liquid fuel goes to the top of the float chamber, there is still ample liquid to cover the outlet from the float chamber to the main jet so that no interruption of fuel feed occurs.

Figure 3:
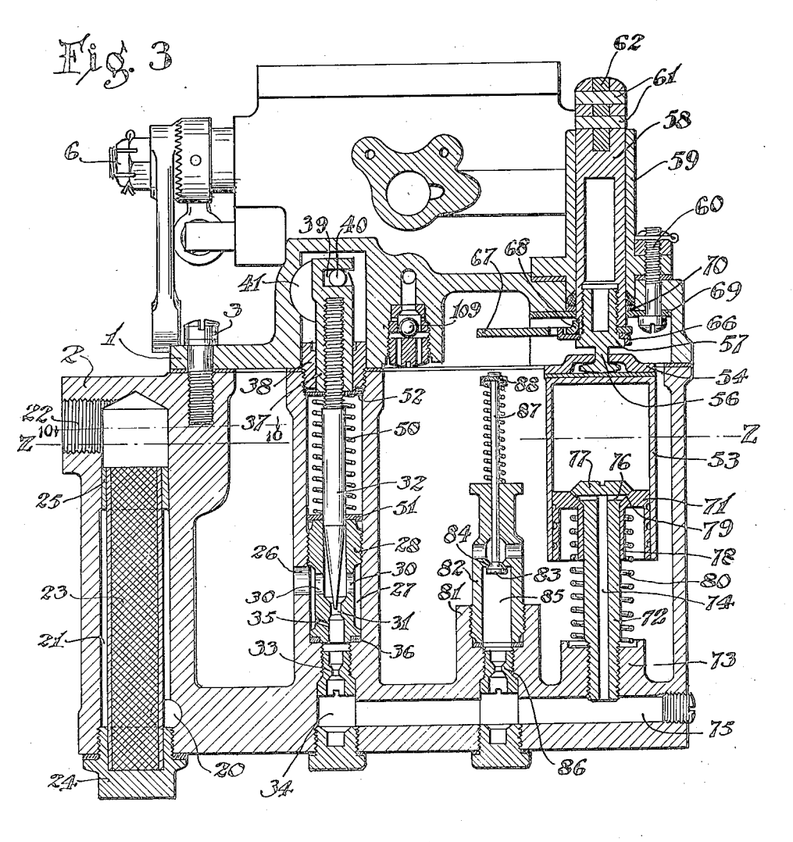
Figure 3 is a section along the line 3—3 of Figure 1.
Figure 4:
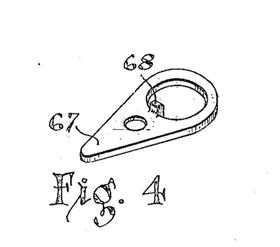
Figures 4, 5 and 6 are perspective views of detail parts of acceleration pump head assembly.
Figure 5:
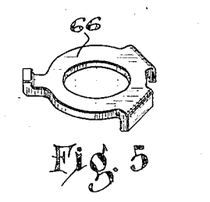

Referring to Figures 1 and 3, it will be noted that the liquid fuel leaves the float chamber 11 through an orifice 26 and flows around the annular groove 27 of a mixture control valve bushing 28 which is secured in a well 29 adjacent the float chamber 11. Bushing 28 has a plurality of relatively large ports 30 which admit fuel to the interior of the bushing, from whence it flows through a central orifice 31, which functions as a seat for the mixture control valve 32, to a main metering restriction 33 below which is a communicating passageway 34 to the main jet nozzle 8.

In the bushing 28, below valve seat 31, is a relatively small by-pass duct 35 through which fuel may flow from annular groove 27 to main metering restriction 33 when valve 32 is on its seat 31 and closes the passage therethrough. Bushing 28 is firmly seated in the bottom of well 29 on a gasket 36 by screw thread engagement with the wall of well 29, so that no leakage can occur from float chamber 11 past bushing 28.

Valve 32 is threaded at its upper end into a cylindrical stem 37 which reciprocates freely through a guide bushing 38 screwed into the top of well 29. Stem 37 carries at its upper end a rectangular recess 39 which engages with a cam pin 40 screw-threaded into cylindrical head 41 of a mixture control shaft 42 which rotates in a horizontal cylindrical bore 43 communicating with well 29. Bore 43 is closed at its outer end by a guide bushing which not only serves as a journal for shaft 42 but which also serves to compress a gasket 45 against its spring pressed seat 46 and thus prevent leakage of liquid fuel out through bore 43 when the carburetor is inverted. Shaft 42 has at its outer end a reduced portion 47 on which is secured an operating arm 48 by a transverse pin 49. Arm 48 is connected at its outer end to a control rod by which the pilot can operate it from his seat. (See Fig. 2.)

In well 29, surrounding valve 32, is a helical spring 50 which seats at its lower end on a washer 51 supported by bushing 28, and at its upper end bears against the lower end of stem 37 through a washer 52, and thus prevents the seating of valve 32 on seat 31 unless said valve is forced down by operating lever 48 acting through shaft 42, pin 40, and slot 39 on stem 37. Passageway through seat 31 is thus normally open unless closed by the pilot operating arm 48.

From the foregoing description, it will be noted that the actual control of the mixture for altitude adjustment is obtained by having in series with a main metering restriction, a mixture control needle valve, with a seat considerably larger than the main metering restriction, adapted to cut off the major part of the flow from the float chamber to the main jet.

In addition, we provide a by-pass passageway around the mixture control needle valve which is always open and which feeds a predetermined quantity of fuel to the main jet when the mixture control valve is closed. This by-pass, therefore, limits the amount of mixture control obtainable and its size is such as to give the correct mixture when the airpane is at or near its ceiling. The use of such a constantly open by-pass makes it impossible for the pilot to accidentally cut off the fuel altogether by improper handling of the control and it also makes the control much less sensitive at altitude.

It will be noted that we do not have the mixture control needle valve seat in the main metering restriction because we want to preserve an exact sea level adjustment of the main metering restriction. Also, it is desirable to be able to change the sea level adjustment by small but exact increments. In the full lean position, the mixture control needle is fully seated. In full rich position, the needle is raised clear of its seat. The area around the needle in the full rich position is larger than the area of the main metering restriction, so that the size of the main metering restriction determines the quantity of fuel passing through the main metering system.

It will also be noted that the altitude control needle is operated by a shaft across the top of the float chamber and engaging the slotted upper end of the needle valve with an eccentric pin. The bore in which the operating shaft is located is of such size that when the end bushing is removed, the whole shaft assembly from the arm 48 to the pin 40 can be withdrawn as a unit. It will be further noted that the altitude control needle valve 32 is threaded into the upper slotted stem 37 so that the length of the needle can be adjusted to seat in any desired position of the mixture control arm 48.

Figure 7:
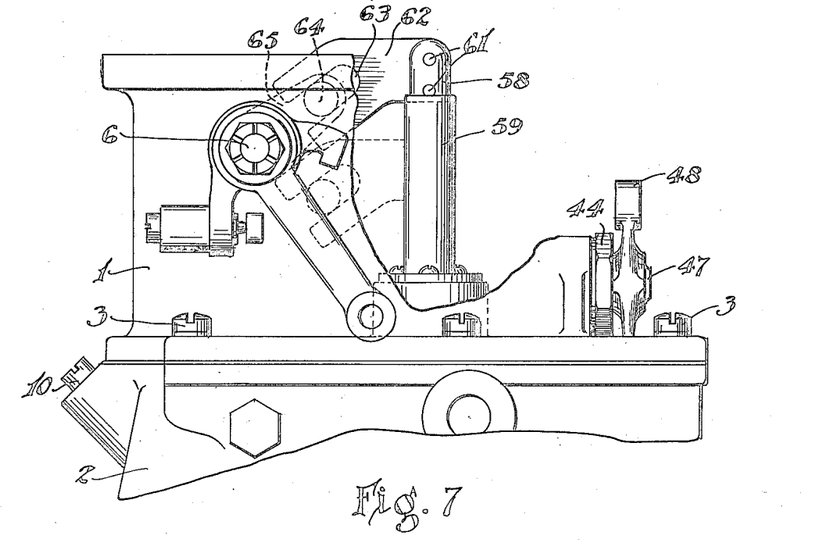
Figure 7 is a side elevation of the upper half of the carburetor showing acceleration pump operating mechanism.

Referring now to Figures 3 and 7, the reference numeral 53 denotes an acceleration pump cylinder having an air-tight integral top to which is fixed a cap 54 having a slot 55 in which fits the shank 56 of a stud bushing 57, the head of which fits under the raised portion of cap 54, as clearly shown in Figure 3. Bushing 57 is screw-threaded into pump stem 58 which in turn is slidably mounted in guide sleeve 59 bolted to the top of body part 1, by bolts 60. Fixedly attached to the top of stem 58 (as by rivets 61) is an angularly disposed arm 62 having a slot 63 which engages a roller 64 on an arm 65 fixed to throttle shaft 6, so that as shaft 6 is rotated to open throttle 5, stem 58 is depressed and thrusts pump 53 down. Arm 62 is inclined so that the line of pressure intersects the bearing at about the middle of slot 63, which we have found is effective in giving smooth action. Guide sleeve 59 is slotted through the upper portion of its length to accommodate arm 62 which rides up and down in this slot and keeps stem 58 from rotating on its axis and arm 62 in aligned position with arm 65.

Figure 6:
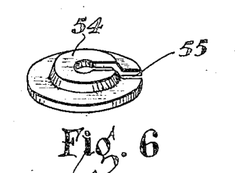

Between the flange on bushing 57 and the lower end of stem 58 is secured by a lock washer 66 an inwardly extending arm 67 having an upturned lug 68 fitted into a groove in the stem 58 so as to prevent axial rotation of arm 67 on said stem. (See also Figures 6 and 7.) Secured to the under side of top portion 1 by bolts 60 and surrounding pump stem 58 is a metal flange washer 69 which holds in place a packing washer 70 which forms a liquid tight joint around stem 58, thereby preventing leakage and splash out of the float chamber 11.

Loosely fitting the inside of pump cylinder 53 is a pump piston 71 which is slidably mounted upon pump stud 72 which in turn is screw-threaded into a boss 73 in the bottom wall of float chamber 11. Stud 72 has an axial passageway 74 communicating at its lower end with a transverse passageway 75 which in turn connects with passageway 34. Passageway 74 communicates at its upper end with a plurality of radial passages 76 in the conical head 77 of stud 72. Piston 71 has a central sleeve 78 which terminates at its top in a conical valve seat 79 co-acting with valve head 77 to close passages 76 when head 77 is contacting with seat 79. Piston 71 is thrust upward by encircling spring 80 so that valve seat 79 is normally held contacting with valve head 77 and passageways 76 are closed.

The operation of the acceleration pump is obvious from the foregoing description. When the throttle 5 is closed, the parts are as shown in Figure 3, the normal fuel level in the float chamber Z—Z, and the cylinder 53 is filled with liquid fuel drawn in by preceding suction stroke of the pump. If, now, the throttle is slowly opened, the liquid fuel in cylinder 53 will escape through the restricted opening between cylinder 53 and piston 71, as there is only a loose fit between these parts. If, on the other hand, the throttle is suddenly opened, the liquid in cylinder 53 cannot escape fast enough as before, and consequently piston 71 is forced down by the pressure on the liquid produced by the downward thrust of the cylinder 53. This unseats valve 77, opening passages 76, 74 and 75, and additional fuel is thus energetically supplied to the main jet nozzle 8. As the fuel escapes from cylinder 53, spring 80 gradually returns valve seat 79 to valve 77 and closes passages 56 so that no further additional fuel is supplied. The features and function of the acceleration pump are covered generically in copending application Serial No. 290,393, filed July 5, 1928, of common ownership with this application, and hence further explanation of this mechanism is necessary. The distinctive feature of the acceleration pump which it is desired to cover and claim in this application is the operating means which constitutes a material improvement over prior devices for this purpose, as will be hereinafter more particularly pointed out.

Referring to Figure 3, it will be noted that cast integral with the bottom of the float chamber 11, near the boss 73, is a similar boss 81 into which is threaded an economizer valve housing 82 carrying an economizer valve 83 which is slidably mounted in the top of housing 82 and seats on a downwardly directed seat 84. Housing 82 has an axial passageway 85, communicating above valve seat 84 with a plurality of radial orifices which open into the float chamber 11, and at its lower end pasageway 85 communicates through a metering restriction 86 with transverse passageway 75 that leads to main jet nozzle 8. Surrounding stem 87 of economizer valve 83, is a helical spring which seats on top of housing 82 and engages the top of stem 87 through an adjustable nut 88, thus keeping valve 83 normally closed and preventing flow of liquid fuel from float chamber 11 to main jet nozzle 8.

It will be noted that the outer end of arm 67 on acceleration pump stem 58 is in line directly above the top of economizer valve stem 87, so that after acceleration pump stem 58 has descended a certain length of its stroke, arm 67 engages stem 87 and carries in or down with the stroke of the acceleration pump. This unseats valve 83 and permits additional liquid fuel to flow from float chamber 11 to main jet nozzle 8 until accelerating pump stem 58 is raised by closing of throttle 5 a sufficient distance to clear the top of economizer valve stem 87 when valve 83 seats and cuts off flow of fuel through the economizer valve. The result of this arrangement is that the economizer valve is automatically brought into action every time the throttle is opened beyond a certain point. This point is determined by the amount of space between the top of stem 87 and arm 67 when valve 83 is closed and arm 67 is in its uppermost position (throttle closed), and this space can be varied by bending arm 67 up or down as may be necessary, or by inserting additional washers between arm 67 and the bottom of stem 58.

From the foregoing description, it will be seen that we have provided a joint operation of the acceleration pump and economizer and that this joint operating member is located inside the float chamber, thereby reducing the areas for leakage from the float chamber and minimizing the entrance of dirt. Our operating arrangement also insures an exact relation of the pump travel to the economizer travel.

In Figure 7 we have illustrated an alternative and preferred arrangement of the economizer and altitude mixture control valve wherein a passageway 89 is provided from the well between the mixture control valve seat 31 and metering restriction 33 to the space in economizer housing 82 above valve seat 84. As this well is kept filled at all times through by-pass 35, the economizer is fed from this source instead of direct from the float chamber as in Figure 3. When valve 32 is closed and valve 83 open, the feed through the economizer is limited and controlled by the size of the by-pass 35 because by-pass 35 is smaller than metering restriction 33 and the combined areas of metering restrictions 33 and 86 are much greater than by-pass 35. However, as valve 32 is opened, the combined areas of bores 31 and 35 are greater than the combined areas of metering restrictions 33 and 86, so that with valve 32 open, metering restriction 33 governs the normal feed to main jet 8, while metering restriction 86 governs the supplementary feed of the economizer when valve 83 is open.

Figures 8, 10:
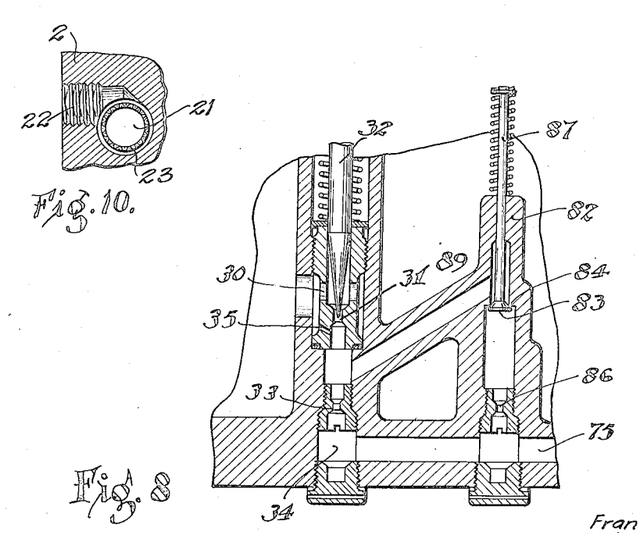
Figure 8 is a fragmentary sectional view of a part of Figure 3 showing an alternate form of economizer construction.
Figure 9 is a side elevation of a modified form of carburetor showing combined manual and automatic altitude control and Figure 10 is a sectional view taken on lines 10—10 of Figure 3.

In the arrangement of Figure 3, with the ordinary air-cooled engine carburetor setting, the main metering jet 33 at sea level delivers about 80% of the fuel and the jet 86 about 20%. As shown in Figure 3, the altitude control is only on the fuel supply to the main metering jet 33. At a height of one-half atmospheric density, about 17,000', the flow through 86 will decrease about as the square root of the density, or to 15% of the total ground flow. At the same time, without correction, the flow through 33 will decrease to 60% of the total ground flow. We would desire about 50% or actually 45% of the total ground flow and using the altitude control of Figure 3, we would have to cut down the delivery through 33 to 30% of the total ground flow, so that this, plus the uncorrected flow of 15% through 86, would equal the 45% just specified. In other words, at this altitude, the flow through 33 would be twice that of 86, whereas on the ground, it is four times. This would mean that at 17,000', with the altitude control so set, if the throttle were closed to a point where valve 83 seated, the mixture would immediately become one-third leaner than with it unseated, which is much too large a step of graduation. The arrangement of Figure 8 overcomes this difficulty because the altitude control operates jointly on the flow through 33 and 86. As a matter of fact, the additional effect of operating the valve 83 becomes less as the effective area of the orifice 31 is decreased by use of the altitude control, which is just what is desired.

The advantage of the foregoing arrangement is that the economizer action is associated with and modified by the altitude mixture control. This is desirable as the amount of economizer action should be reduced in proportion as altitude is gained. Otherwise, with a constant economizer feed, its proportionate effect at high altitudes is greater and a point is reached when over-enrichment results from economizer operation.

Figure 9:
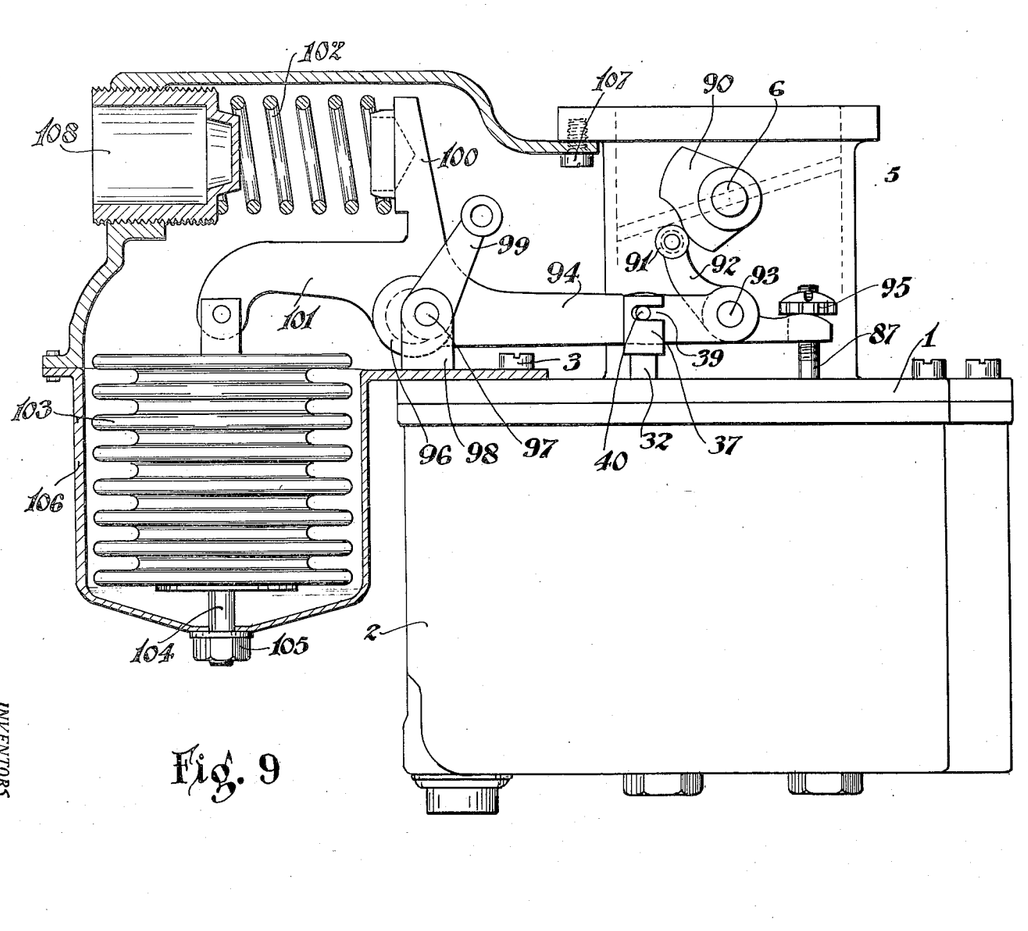

In Figure 9 we have shown an alternative automatic arrangement for the altitude control with regulation of economizer action. In this form of carburetor the construction of the mixture control and economizer valves are the same as in Figure 3 except that valve stems 32 and 87 are carried up through liquid-tight holes in the top of the float chamber and the economizer valve is lifted to open instead of being depressed as in Figure 3. In order to raise the economizer valve with the opening of the throttle, we have provided a cam 90 fixed on the end of the throttle shaft 6 and engaging a roller 91 on a rocker arm 92 which is pivoted on a floating shaft 93 attached to one end of an operating lever 94. The other end of rocker arm 9 is forked and engages the under side of an adjustable nut 95 threaded on the end of economizer valve stem 87. As throttle 5 is opened, cam 90 depresses the roller end of arm 92, which raises the forked end of the arm and the valve stem 87, thus opening the economizer valve.

The cam pin 40 which engages in the recess 39, instead of being carried on the end of a rotatable shaft, as in Figure 3, is here fixed to lever 94 and serves to move valve stem 32 up and down as lever 94 is oscillated about its eccentric pivot 96. The shaft 97 of the eccentric 96 is journaled in a plurality of ears 98 integral with body 1, and is rotated by a manual control lever 99 operated by a control from the pilot's seat (not shown) and this shifts the axis of oscillation of lever 94. On the other side of eccentric 96, lever 94 branches into two arms 100 and 101 which engage respectively a spring 102 and an aneroid bellows 103. Bellows 103 opposes the action of spring 102 and permits it to oscillate lever 94 only as the bellows is lengthened and shortened by atmospheric air pressure. Bellows 103 is anchored at its bottom by bolt 104 and nut 105 engaging housing 106 which is bolted to body 1 by one of screws 3 and a screw 107 tapped into the under side of the manifold flange on body 1. Spring 102 seats in an adjustable seat 108 screw-threaded into housing 106.

The operation of this mechanism is apparent from the foregoing description. As altitude is gained, the diminishing atmospheric pressure permits bellows 103 to expand and allows spring 102 to oscillate lever 94 about its eccentric axis 96 thus depressing pin 40, closing valve 32, and also lowering shaft 93 which lowers the fulcrum of economizer rocker arm 92, thus diminishing the throw of the end engaging stem 87 when cam 90 operates on the roller end 91. In other words, this diminishes the economizer effect with gain in altitude, as does the construction shown in Figure 8. Also, the economizer needle valve raising is delayed to a greater throttle opening which is also desirable.

In addition to the foregoing automatic action, however, the construction shown in Figure 9 has the further advantage of manual control by the operation of lever 99 which shifts the center of oscillation of lever 94 and thus modifies its automatic action, by changing the throw of the lever 94a compared to the movements of arms 100 and 101.

A ball check valve 109 (Figure 3) is provided in the top of float chamber 11, to vent this chamber during normal operation and to prevent escape of liquid fuel when the carburetor is inverted.

Although we have illustrated and described a preferred embodiment of our invention, we are aware that modifications and changes can be made therein by those skilled in the art without departing from the scope of the invention as defined in the appended claims; therefore we do not wish to be limited in these respects, or otherwise than by the terms of the appended claims.

We claim:

1. In a carburetor, a float chamber having generally straight substantially parallel walls, a submerged fuel outlet port, and a semi-cylindrical float nearly submerged in said chamber, whereby when said chamber is inverted the depth of submergence of said port is substantially the same as when said chamber is in upright position.

2. In a carburetor having a fuel nozzle, a float chamber rectangular in vertical fore-and-aft cross section, and a semi-cylindrical float extending in a fore-and-aft direction in said chamber, said float having straight parallel sides whereby there is a minimum variation of fuel level at said nozzle with lateral inclinations of said carburetor, and said float having a semi-cylindrical bottom whereby its liquid displacement is substantially the same with moderate fore and aft inclinations of said carburetor.

3. In a carburetor, an altitude mixture control device, comprising a metering restriction of calibrated size to pass desired mixture proportions of fuel at sea level, a valve in series with said metering restriction adapted to reduce the flow of liquid fuel through said metering restriction as altitude is gained, and a by-pass around said valve of calibrated size to give desired mixture proportion at highest operating altitude when said valve is closed.

4. In a carburetor having a main jet nozzle, an altitude mixture control device comprising a metering restriction governing the normal flow of liquid fuel to said nozzle, said metering restriction being calibrated to pass the desired mixture proportion of liquid fuel at sea level operation, and means operable from the operator's position to change the sea level adjustment of said metering restriction by exact calibrated increments.

5. In a carburetor having a float chamber, an altitude control device comprising an operating shaft journaled across the top of said float chamber and having on one end an eccentric cam means, said shafts being of larger diameter than the eccentricity of said cam means whereby said shaft and cam means may be removed as a unit from the carburetor without disturbing any other parts thereof.

6. In a carburetor, an altitude mixture control valve controlling the main supply to the carburetor, an auxiliary fuel supply valve and an automatic means for modifying the operation of said valves in proportion to change in altitude of the carburetor.

7. In a carburetor, an altitude mixture control valve controlling the main supply to the carburetor, an auxiliary fuel supply valve, and atmospheric pressure responsive means for automatically operating said valves with changes in altitude of the carburetor.

8. In a carburetor, an altitude mixture control valve controlling the main supply to the carburetor, an auxiliary fuel supply valve and a combined manual and automatic means for operating said valves.

9. In a carburetor having a throttle, an economizer valve, means for operating said valve from said throttle, and means for automatically modifying the action of said operating means with changes in altitude of the carburetor.

10. In a carburetor, a float chamber having generally straight parallel walls and a flat cover, a kidney-shaped float nearly submerged in said chamber, a fuel passage having a submerged fuel outlet port in the chamber side wall, said float having its upper side adjacent the cover whereby when said chamber is inverted the depth of submergence of said outlet port is substantially the same as when said chamber is in the upright position, a metering restriction in said fuel passage, a manually controlled valve controlling an opening in series with the metering restriction and a by-pass around said valve of calibrated size to give desired fuel mixture proportion at highest operating altitude when said valve is closed.

FRANK C. MOCK.
JEPTHA MACKENZIE MILLER.

CERTIFICATE OF CORRECTION.

Patent No. 1,933,381.                                                     October 31, 1933.

FRANK C. MOCK, ET AL.

It is hereby certified that error appears in the printed specification of the above numbered patent requiring correction as follows: Page 5, lines 111, 117 and 123, claims 6, 7 and 8, respectively, after "main" insert the word fuel; and that the said Letters Patent should be read with these corrections therein that the same may conform to the record of the case in the Patent Office.

Signed and sealed this 9th day of January, A. D. 1934.

F. M. Hopkins (Seal)                                                    Acting Commissioner of Patents.